(12) United States Patent
Holmén (10) Patent No.: US 8,210,915 B2
(45) Date of Patent: Jul. 3, 2012

(54) COMBINE HARVESTER WITH SPREADER FANS

(75) Inventor: Bengt Holmén, Skara (SE)

(73) Assignee: Rekordverken Sweden AB, Kvanum (SE)

( * ) Notice: Subject to any disclaimer, the term of this patent is extended or adjusted under 35 U.S.C. 154(b) by 120 days.

(21) Appl. No.: 12/451,383

(22) PCT Filed: Jun. 17, 2008

(86) PCT No.: PCT/SE2008/050725
§ 371 (c)(1),
(2), (4) Date: Nov. 10, 2009

(87) PCT Pub. No.: WO2008/156419
PCT Pub. Date: Dec. 24, 2008

(65) Prior Publication Data
US 2010/0120482 A1    May 13, 2010

(30) Foreign Application Priority Data
Jun. 20, 2007  (SE) ...................................... 0701510

(51) Int. Cl.
*A01F 12/40* (2006.01)
(52) U.S. Cl. ......................................... 460/112; 460/111
(58) Field of Classification Search ................... 460/111, 460/112
See application file for complete search history.

(56) References Cited

U.S. PATENT DOCUMENTS

| | | | |
|---|---|---|---|
| 5,976,011 A | 11/1999 | Hartman | |
| 6,343,986 B1 | 2/2002 | Hofer | |
| 6,416,405 B1 | 7/2002 | Niermann | |
| 6,602,131 B2 * | 8/2003 | Wolters | 460/111 |
| 6,663,485 B2 | 12/2003 | Niermann | |
| 6,736,721 B2 | 5/2004 | Niermann et al. | |
| 7,094,146 B2 | 8/2006 | Holmén | |
| 7,306,174 B2 | 12/2007 | Pearson et al. | |

(Continued)

FOREIGN PATENT DOCUMENTS

DE    2234567    1/1974

(Continued)

OTHER PUBLICATIONS

European Search Report dated Jan. 27, 2011 for corresponding European Application No. 08767191.3.

(Continued)

*Primary Examiner* — Alicia Torres (74) *Attorney, Agent, or Firm* — Harness, Dickey & Pierce, P.L.C.

(57) ABSTRACT

Example embodiments relate to a combine harvester including a straw chopper having an inlet for unchopped straw, an outlet for chopped straw in an essentially horizontal direction, and a spreader fan, connected downstream of the outlet of the straw chopper and having an essentially horizontal plane of rotation, for spreading the chopped straw over a ground surface. The combine harvester further includes a guide member, which is arranged to deflect at least a part of the stream of chopped straw material to an axial intake of the spreader fan such that the part of chopped straw material meets the blades of the spreader fan in the direction of transport of the chopped straw material through the spreader fan at an acute angle ($\alpha$) relative to the plane of rotation of the spreader fan. The part of the stream of chopped straw material thereby contributes to the material movement through the spreader fan.

19 Claims, 8 Drawing Sheets

U.S. PATENT DOCUMENTS

| | | | |
|---|---|---|---|
| 7,331,855 B2 * | 2/2008 | Johnson et al. | 460/112 |
| 7,553,227 B2 * | 6/2009 | Landuyt | 460/111 |
| 7,635,299 B2 * | 12/2009 | Murray et al. | 460/111 |
| 7,896,732 B2 * | 3/2011 | Benes et al. | 460/112 |
| 7,927,200 B2 * | 4/2011 | Van Overschelde et al. | 460/112 |
| 8,029,347 B2 * | 10/2011 | Pohlmann et al. | 460/112 |
| 2002/0142814 A1 | 10/2002 | Niermann | |
| 2003/0017861 A1 | 1/2003 | Niermann et al. | |
| 2004/0172117 A1 | 9/2004 | Hill et al. | |
| 2005/0124399 A1 | 6/2005 | Holmen | |
| 2005/0194473 A1 | 9/2005 | Pearson et al. | |

FOREIGN PATENT DOCUMENTS

| | | |
|---|---|---|
| DE | 102007037485 | 1/2009 |
| EP | 0 631 717 A1 | 1/1995 |
| EP | 0 631 717 B2 | 4/1998 |
| EP | 1 031 273 | 8/2000 |
| EP | 1277387 | 1/2003 |
| EP | 1 570 726 | 9/2005 |
| EP | 1 859 668 | 11/2007 |
| EP | 1 897 430 | 3/2008 |
| WO | WO 03/071857 | 9/2003 |

OTHER PUBLICATIONS

European Search Report dated Jan. 27, 2011 for corresponding European Application No. 10166203.9.

International Search Report.

Office Action dated Jun. 1, 2011 for corresponding Canadian Application No. 2,684,937.

* cited by examiner

COMBINE HARVESTER WITH SPREADER FANS

TECHNICAL FIELD

The present invention relates to a combine harvester comprising a straw chopper having an inlet for unchopped straw, an outlet for chopped straw in an essentially horizontal direction, and a spreader fan, connected downstream of the outlet of the straw chopper and having an essentially horizontal plane of rotation, for spreading the chopped straw over a ground surface.

BACKGROUND OF THE INVENTION

Combine harvesters are becoming increasingly large and with ever wider cutting tables to enable a field to be threshed in an effective manner. The cutting table is, in itself, essentially wider than the actual harvester. During threshing, crop residues, such as chaff and straw, are generated. Unless the straw is to be collected, it is usually chopped into small pieces in a straw chopper, before it and the chaff are distributed on the field to help provide nutrient for forthcoming crops. For a variety of reasons, it is desirable to spread the crop residues behind the combine harvester and to the sides, as evenly as possible over a region essentially corresponding to the width of the cutting table. As the cutting tables become wider, it becomes increasingly difficult to spread over the whole of the intended width. The straw chopper generates in the chopping kinetic energy, which is utilized to spread the residues over the field, and this energy is sufficient for a width of about 8-9 m. When the cutting tables extend beyond 9 m, this kinetic energy is no longer sufficient.

By arranging fans downstream of the straw chopper, it is possible to handle and spread a larger quantity of crop residues and to do so over the larger width. EP 1 031 273 shows a combine harvester of the above-described type, which has fans for spreading the crop residues. In this solution, the outlet of the straw chopper is in the same plane as the inlets of the fans so as not to lose kinetic energy from the straw chopper. One problem with this solution is that chopped straw can be forced back from the fans to the straw chopper and thus prevent chopped straw from being blown out. In order to avoid this, large-diameter fans have therefore been provided to prevent chopped straw from being blown back into the chopper. Only half the width of the fan can thus be utilized and, in principle, the fans therefore need to be twice as wide. With twice as wide fans, the equipment becomes not only more cumbersome, but also dearer and more complex.

The object of the invention is therefore to provide a straw chopper having a feed-out device to enable straw to be spread at least over a width of about 9 m, but which, at least in part, is not afflicted by the above-stated problems.

SUMMARY OF THE INVENTION

The object of the present invention is achieved by a combine harvester which comprises a straw chopper having an inlet for unchopped straw, an outlet for chopped straw in an essentially horizontal direction, and a spreader fan, connected downstream of the outlet of the straw chopper and having an essentially horizontal plane of rotation, for spreading the chopped straw over a ground surface. The combine harvester has a guide member, which is arranged to deflect at least a part of the stream of chopped straw material to an axial intake of the spreader fan such that said part of chopped straw material meets the blades of the spreader fan in the direction of transport of the chopped straw material through the spreader fan at an acute angle relative to the plane of rotation of the spreader fan, whereby said part of the stream of chopped straw material contributes to the material movement through the spreader fan.

Such a spreader fan requires that a certain amount of energy is supplied to enable the crop residues to be well spread over the harvested width. The guide member deflects the stream of chopped straw before it flows into the spreader fan in such a way that a certain part of the kinetic energy of the stream of chopped straw is utilized in the spreading of crop residues, for example chaff and chopped straw. An essentially horizontal motional component of the stream of chopped straw is thus maintained, which helps in the spreading of crop residues by virtue of the fact that the flow already has within it a certain movement from the straw chopper in the rearward direction, calculated in relation to the direction of travel of the combine harvester. In addition, this movement can help to drive the spreader fan. This utilization of the movement of the straw from the straw chopper does not however mean that the spreader fan is wholly dependent on an additional supply of energy from the straw chopper. Based on the requirements of the user in the individual case, there may be a need to drive the straw chopper and/or other material transport inside the combine harvester at different speed, thereby affecting the movement of the chopped straw into, through and out of the spreader fan. The contribution which is nevertheless made by the movement is, however, always positive according to the present invention. Since a part of the kinetic energy of the chopped straw is utilized in the spreading, the necessary energy for driving of the outlet fan can be reduced, i.e. a more compact fan motor with lower power can be used. Since the stream of chopped straw material is led axially into the spreader fan, the full width of the spreader fan can be utilized without chopped straw being returned to the straw chopper, which can result in a simple and compact construction of the spreader fan. A straw chopper in combination with a spreader fan for spreading crop residues in a combine harvester can therefore be dimensioned in a resource-saving and compact and simple manner. The guide member is preferably formed by a deflector plate, which is disposed, as seen in the vertical direction, below or above the spreader fan.

Preferably, another part of the stream of chopped straw material is deflected at a more obtuse angle relative to the plane of rotation of the fan than in the region in which the transport action of the fan is equidirectional with the incoming stream of chopped straw material. It is therefore possible to brake the inflowing straw before it meets the fan blades in a region in which the straw would otherwise have braked them, i.e. in a region in which the trans-port action of the fan is oppositely directed to the stream of chopped straw material from the straw chopper. The straw therefore meets the fan blades without, in principle, any velocity, almost only vertically downwards towards the axial intake of the spreader fan. The full width of the spreader fan can thus be utilized without unnecessary energy losses. A compact and low-resource arrangement for spreading crop residues is therefore provided in a combine harvester. In this case, the guide member is preferably configured as a deflector plate having a first portion for deflecting a part of the stream of the chopped straw and a second portion for deflecting another part of the stream of the chopped straw.

Said acute angle relative to the plane of rotation of the spreader fan is preferably 10-40°, more preferably 20-30° and most preferably 23-28°, which, by thorough testing, has proved suitable for utilizing a part of the kinetic energy of the stream of chopped straw material.

Said more obtuse angle relative to the plane of rotation of the spreader fan is preferably 30-60°, more preferably 40-50° and most preferably 43-48°, which, by thorough testing, has proved suitable for braking another part of the inflowing straw such that it does not inhibit the blades of the spreader fan in a region in which the transport action of the spreader fan is oppositely directed to the stream of chopped straw material from the straw chopper. A part of the stream of chopped straw material can thus be deflected such that it meets the fan blades without, in principle, any velocity.

Preferably, the spreader fan has a front shield disposed along a part of the periphery of the spreader fan, as seen in the circumferential direction. The shield helps the chopped straw to leave the spreader fan in the desired spreading direction and therefore prevents straw from being returned into the straw chopper and/or other parts of the combine harvester.

Preferably, the spreader fan has a front peripheral intake situated such that the transport action of the fan is equidirectional with the material flow feeding in through said peripheral intake. For example, the intake can be utilized to feed in chaff from a sieve unit in the spreader fan to enable it to be spread together with the chopped straw. It is thus possible to utilize the spreader fan also for even spreading of, for example, chaff.

Preferably, the spreader fan has a collecting table fixedly attached to the fan blades on their side facing away from the axial intake. The collecting table therefore forms a bottom of the spreader fan and can prevent crop residues from being axially conveyed out of the fan, regardless of the other spatial positioning of the spreader fan.

Preferably, the combine harvester additionally has a spreading member, which is pivotally disposed downstream of the spreader fan, said spreading member being pivotable between a first and a second outer position. In the first outer position, the stream of crop residues meets the spreading member at an angle which is greater than the angle at which the stream of crop residues meets the spreading member in the second outer position. When the spreading member is in the first outer position, the stream of crop residues is deflected most in the corresponding direction in relation to the combine harvester. When the spreading member is in the second outer position, the stream of crop residues is deflected most in the corresponding other direction. In this way, the spreading member, as it swings between its outer positions, helps the crop residues to be distributed in a manner determined by the user of the combine harvester. The spreading member thus improves the spreading by the spreader fan, both in evenness and in width over the field. As a result of its simple construction and hence low weight, the spreading member can swing faster than previously known variants, so that the spreading of the straw can be almost continuous despite its swinging motion. Furthermore, the swinging frequency can be adjusted so that even spreading is obtained at different operating speeds of the combine harvester and spreader fan respectively. In addition, the spreading member can be made to swing between other positions than said outer positions to take account of, for example, wind conditions.

Preferably, the combine harvester comprises a second spreader fan, which is disposed alongside and in the same plane as the first spreader fan. The second spreader fan preferably acts in the opposite motional direction relative to the first spreader fan. As a result of this solution, a symmetrical appearance is obtained, which can be advantageous by virtue of the fact that the respective spreader fan only serves the corresponding half of the combine harvester and that the two spreader fans can interact. The interaction between two symmetrically placed spreader fans can result in a simpler construction thereof. In addition, other parts than the spreader fans can themselves be constructed more simply. A further advantage is that each spreader fan is controlled individually, whereby wind conditions can be taken into account.

Preferably, the spreading member is wedge-shaped and disposed essentially between two spreader fans, which allows the stream of chopped straw material from two mutually adjacent spreader fans to be guided simultaneously. When the spreading member in this case is in one outer position, the stream from one of the spreader fans is deflected most in this direction, whilst the stream from the other spreader fan is deflected most in relation to "its" spreader fan. This latter means, by virtue of the arrangement of two spreader fans, that the stream of chopped straw material from this second spreader fan is deflected directly rearwards about the center axis or line of symmetry of the combine harvester. When the spreading member is instead in the other outer position, the stream is deflected from the first spreader fan directly rearwards about the center axis of the combine harvester, whilst the stream from the second spreader fan is deflected most. By making the guide member swing between these two outer positions, even spreading and full-width spreading of the chopped straw from two spreader fans is obtained.

The spreading member preferably has two essentially flat spreading surfaces, which are arranged to swing in tandem, each surface being disposed on the, in relation to the combine harvester, outer side of the respective spreader fan. It is therefore possible to control the spreading from the outlet of the respective spreader fan individually.

The spreading surfaces of the spreading member can be arranged to be individually adjustable in relation to the respective spreader fan, which makes it possible to control the discharge of the respective spreader fan in a variety of ways. The respective spreading surface can thus be given various outer positions in relation to its respective spreader fan. This can be advantageous in the event of, for example, side wind.

Preferably, the rotation speed of the respective spreader fan is arranged to be controlled individually, which makes it possible, for example, to adjust the spreading in dependence on wind conditions.

BRIEF DESCRIPTION OF THE DRAWINGS

The invention will now be described in greater detail on the basis of the following drawings. The drawings should be regarded as purely for illustrative purposes and have no limiting effect. In the drawings.

DETAILED DESCRIPTION OF A PREFERRED EMBODIMENT

Figure 1:
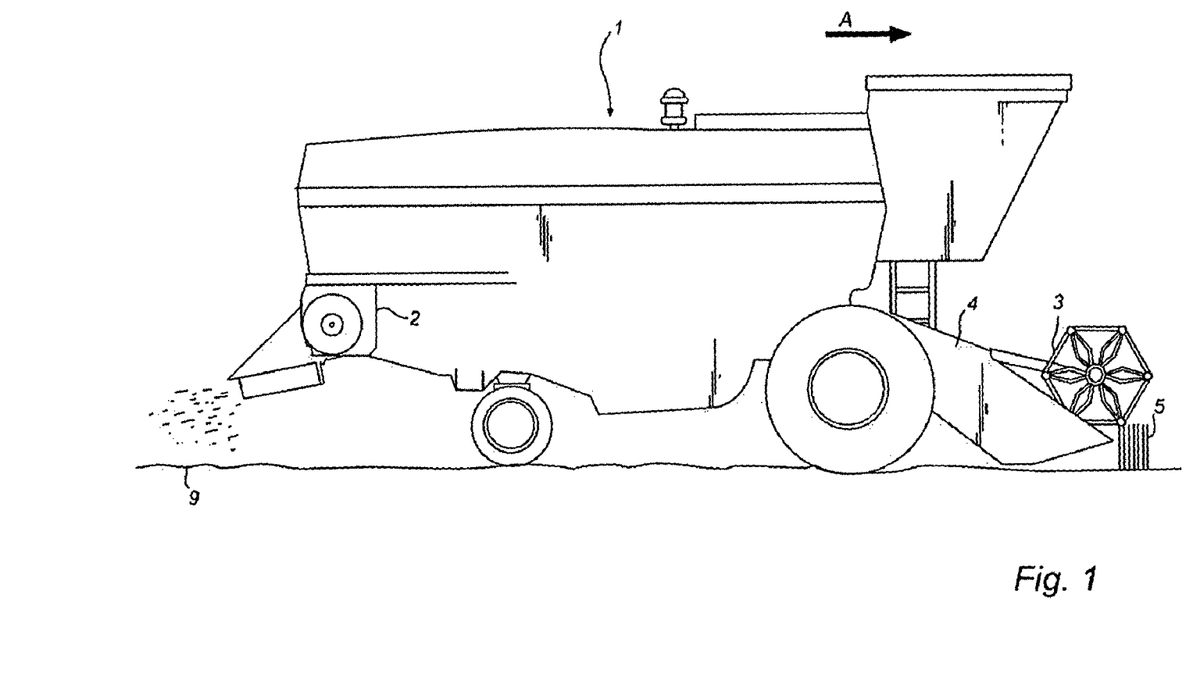
FIG. 1 shows in side view a combine harvester having a straw chopper according to the present invention.

The combine harvester 1 shown in FIG. 1 is of otherwise conventional type, having a cutting table 4 with a pick-up drum 3 for gathering up straw forage 5. The cutting table 4, together with the pick-up drum 3, is 9 m and above in width, which nowadays is becoming increasingly common so as to allow a field 9 to be harvested quickly and effectively. Within the combine harvester 1 there are then devices for separating grain from stems (straw), chaff and other crop residues. These devices comprise, for example, a sieve 6 (see FIG. 2) for sifting out chaff from grain, a straw shaker 7 (see FIG. 2) for guiding straw rearwards in the direction of travel of the combine harvester 1, and a collecting bin (not shown) for the separated grain.

In this patent application, a reference to the directions "behind" and "in front of" relates to a position behind and in front, as seen in the normal forward-directed direction of travel A of the combine harvester 1.

In the rear part of the combine harvester 1 sits the straw chopper 2, arranged with two symmetrically placed spreader fans 8 according to the present invention. The straw chopper 2 is of conventional type and is arranged vertically below the rear end of the straw shaker 7. The straw chopper 2 has the task of chopping the straw if it is not to be windrowed for subsequent collection, but is instead to be spread evenly over the field 9. If the straw is chopped into smaller pieces, it is more easily ploughed back into the ground and does not stick as easily in a plough. Furthermore, it is more easily broken down and forms mull and contributes with nutrients to the next crop. It is therefore important that the spreading of the straw is even over the field and over a width corresponding to the cut width represented by the cutting table 4.

The two spreader fans 8 have the task of spreading the straw in the above-stated manner. Previous combine harvesters 1 of narrower width have not needed these, since the straw chopper 2, in the chopping operation, has given the straw sufficient velocity, or kinetic energy, to be spread over the intended width. With the new wider combine harvesters 1, this kinetic energy is insufficient, but rather additional velocity is given to the straw in the spreader fans 8. In the preferred embodiment of the invention, the spreader fans 8 are arranged on one level vertically below and behind the straw chopper 2. The arrows 11 represent the path of the chopped straw from the straw chopper 2 and into the spreader fans 8, and out of the spreader fans 8.

Below the straw shaker 7, as seen in the vertical direction, is placed the sieve 6. Not only may the straw need to be spread evenly over the field 9, but also chaff needs to be distributed. Below the rear end portion of the sieve 6, as seen in the vertical direction, sit two symmetrically placed chaff spreader fans 10. The arrows denoted by 12 relate to the path of the chaff out of the chaff spreader fans 10 and out of the spreader fans 8, if the latter are also utilized for the spreading thereof. In an alternative but non-illustrated embodiment, the chaff spreader fans 10 can be pivoted about their axis and can instead spread the chaff at a greater or lesser angle out from the sides of the combine harvester 1. In this embodiment, the chaff does not therefore pass through the spreader fans 8.

Figure 2:
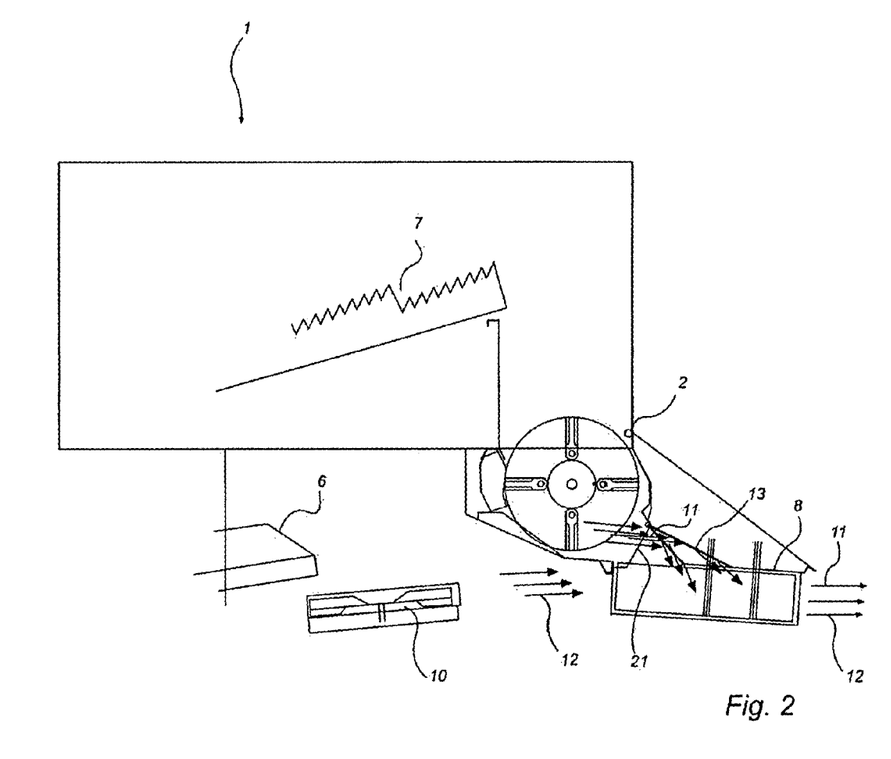
FIG. 2 shows in sectioned side view the rear part of the combine harvester in FIG. 1.
Figure 3:
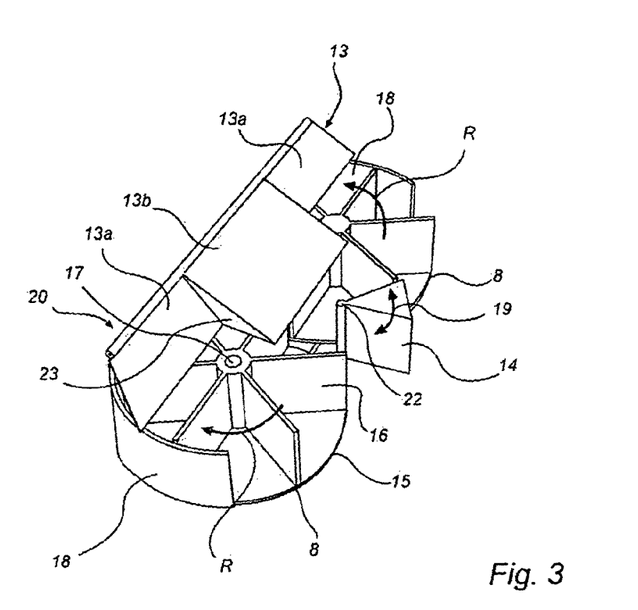
FIG. 3 shows a perspective view of selected parts of the combine harvester in FIG. 1.

FIG. 3 shows a perspective view of only parts of the spreader fans 8 in order to illustrate their working. The spreader fans 8 sit side by side and in the same plane. They each sit suspended about a respective essentially vertical shaft 17. The fans comprise fan blades 16, which extend radially outwards from the shaft 17, and in their lower axial plane, as seen in the vertical direction, a disc 15 is disposed at the respective bottom edges of the fan blades 16. During use a cover is provided, which is not shown in the figure. An opening 20 in this cover is present in the front edge of the cover and therefore the edge facing towards the straw chopper 2. This opening 20 forms an inlet 20 for chopped straw. The opening 20 extends rearwards towards and ends close to a guide plate 13 sitting transversely to the spreader fans 8. When the guide plate 13 is connected to the opening 20, the cover's extension is such that it covers the remaining parts of the spreader fans 8. This guide plate 13 extends continuously from a level above the opening 20 downwards and rearwards towards the spreader fans 8. Its upper level, as seen in the vertical direction, is placed above the outlet opening 21 of the straw chopper 2, as seen in the vertical direction, as is shown in FIG. 2.

The guide plate 13 is divided into three portions 13a, 13b and 13a. A first portion 13a extends from one side of the combine harvester 1 towards, but not right up to, the line of symmetry of the combine harvester 1. This first portion 13a extends at least past the shaft 17 of the spreader fan 8. The second portion 13b begins where the first portion 13a ends and extends towards the other side of the combine harvester 1, but no further than up to the shaft 17 of the second spreader fan 8 at the most. There the third portion 13a then begins, which extends up to the other side of the combine harvester 1. In terms of shape and placement, the first and the third portion 13a therefore mutually correspond. Together with the second portion 13b, they therefore form a guide plate 13 symmetrical about the line of symmetry of the combine harvester 1. The difference between the three portions 13a and 13b is that they form different angles $\alpha$, $\beta$ to the spreader fans 8. The first and the third portion 3a thus form essentially the same angle $\beta$ to the spreader fans 8, whilst the second portion 13b forms a shallower angle $\alpha$ than the first and third portion 13a to the spreader fans 8. In the transitions between the different portions 13a and 13b there is a sealing plate 23, which is arranged to ensure that no chopped straw from the straw chopper 2 is spread other than down into the spreader fans 8. The angle $\beta$ in respect of the first and the third portion 13a forms an angle of 40-50° to the plane of rotation of the spreader fans, whilst the second portion 13b forms an angle $\alpha$ of 20-30° to the plane of rotation of the spreader fans.

Figure 5:
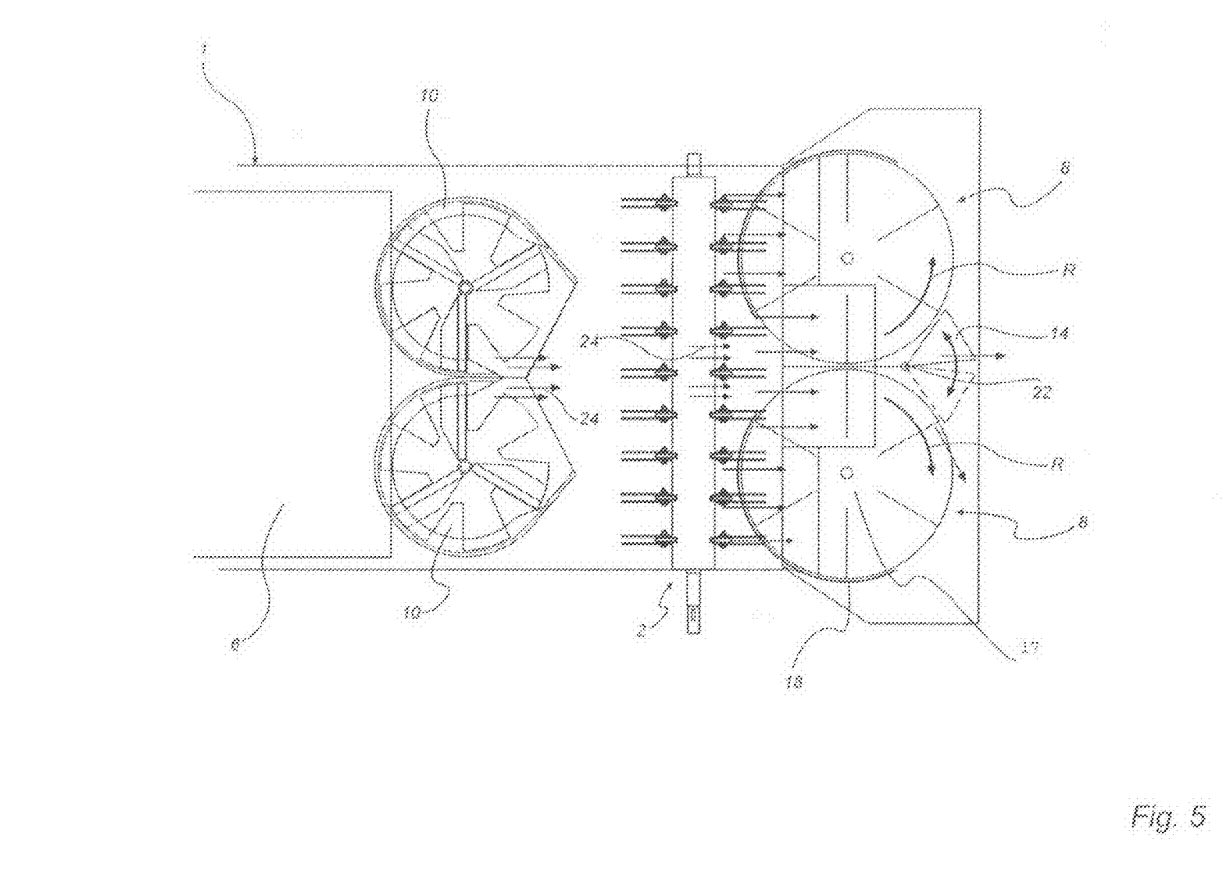
FIG. 5 shows in plan view the rear part of the combine harvester in FIG. 1.

Along the periphery of the respective spreader fan 8 there is disposed a baffle plate 18. It extends from a level adjoining the discs 15, but is not fixedly fitted to these, and vertically upwards to the level adjoining the inlet openings 20. They thus shield the spreader fans 8 in the radial direction. The baffle plates 18 run along the sides of the spreader fans 8 which face away from each other, i.e. on the outer sides of the combine harvester 1, and along the sides facing in the direction of travel of the combine harvester, and follow essentially the rounded shape of the spreader fans 8. One end portion of the baffle plates 18 is situated in a position directly past the respective shaft 17 in the direction of the second spreader fan 8 and viewed in the lateral direction of the combine harvester 1. The baffle plates 18 extend along the periphery of the spreader fans 8 towards the respective other end portion thereof. This other end portion is situated directly past the respective shafts 17 of the spreader fans 8 viewed in the direction of travel of the combine harvester 1, i.e. behind said shafts 17. This is best illustrated in FIG. 5. In the preferred embodiment of the invention, this position is occupied by the baffle plates 18 and relates to a situation where the spreader fans rotate such that the straw is released from the fan blades 16 in the portion between the spreader fans 8 and that they spread the straw rearwards.

In FIG. 3 there is also illustrated a spreading member 14, which is placed between the spreader fans 8, essentially on the line of symmetry between them and directly behind the point where the spreader fans 8 are placed closest together. The spreading member 14 is arranged as a V-shaped or wedge-shaped plate, with its apex placed forwards and pivotally suspended about a shaft 22. The angle of the plate is formed by the legs of the V and is fixed and adjusted to form the spreading pattern, see FIG. 6 and as described in greater detail below. In the preferred embodiment, the sides of the plate are flat in both the vertical direction and rearwards along its legs, but can conceivably be concave in construction and at least partially follow the curvature of the periphery of the spreader fans 8. For stabilization of the spreading member 14, the two sides represented by the legs of the V are connected to a further plate. In FIG. 5, the spreading member 14 is shown with a solid line in its one outer position and with a dashed line in its other outer position, between which outer positions it is arranged to swing, as is illustrated with the arrow 19.

Figure 4:
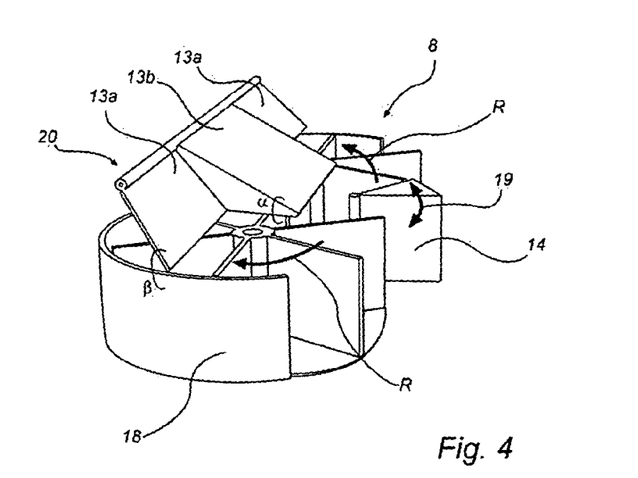
FIG. 4 shows a perspective view of selected parts of the combine harvester in FIG. 1.

FIG. 4 shows in a perspective view somewhat different from FIG. 3 the spreader fans 8 and the guide plate 13. The figure illustrates the angles α, β between the different portions 13a, 13b of the guide plate 13, in relation to the plane of rotation of the spreader fans 8. The working of the spreader fans 8 and the guide plate 13 will now be described in greater detail. Unchopped straw is guided rearwards in the combine harvester 1 with the aid of the straw shaker 7 and tumbles down into the straw chopper 2. There it is cut by means of knives into smaller pieces of chopped straw. The straw chopper 2 gives the chopped straw a certain velocity rearwards in an essentially horizontal direction, as is illustrated in FIG. 2 by the arrows 11. It meets in this position the guide plate 13 and is deflected so as to be guided downwards and rearwards into the spreader fans 8 through the inlet 20 thereof. The spreader fans 8 give the chopped straw additional velocity in the rearward direction. The different portions 13a and 13b of the guide plate ensure that the chopped straw from the different transverse portions of the straw chopper 2 meet the fan blades 16 such that as much velocity as possible from the straw chopper 2 is preserved and utilized to improve the spreading and reduce the energy required to drive the spreader fans 8. With the aid of the guide plate 13, the chopped straw is therefore given a, relatively speaking, acute angle α in relation to the fan blades 16 in the portion 13b in which the momentum of the straw is not to be halted, but rather the rotation R of the spreader fans 8 shall interact with the velocity and direction of the straw, i.e. between the two shafts 17, for the spreading of the straw. In the two portions 13a in which the rotation R of the fan blades 16 would instead be impaired or inhibited by such an acute angle α, the angle is instead significantly more obtuse β to allow the straw to meet the fan blades 16 without, in principle, any velocity, almost only vertically downwards towards the discs 15, so that the spreader fans 8 can execute the spreading in an optimal manner without unnecessary energy losses. In this way, the spreader fans 8 can be dimensioned and produced in a resource-saving manner and their full width can be utilized, which makes them compact and not unnecessarily bulky.

In FIG. 5, the arrows 24 show the path of the chaff beneath the straw chopper 2 and through the spreader fans 8 if the chaff is to be mixed into the straw. The baffle plate 18 also therefore ends in the above-described position, so that a peripheral intake is formed to enable the chaff to be blown into the spreader fans 8 and guided further rearwards for additional spreading.

Figure 6:
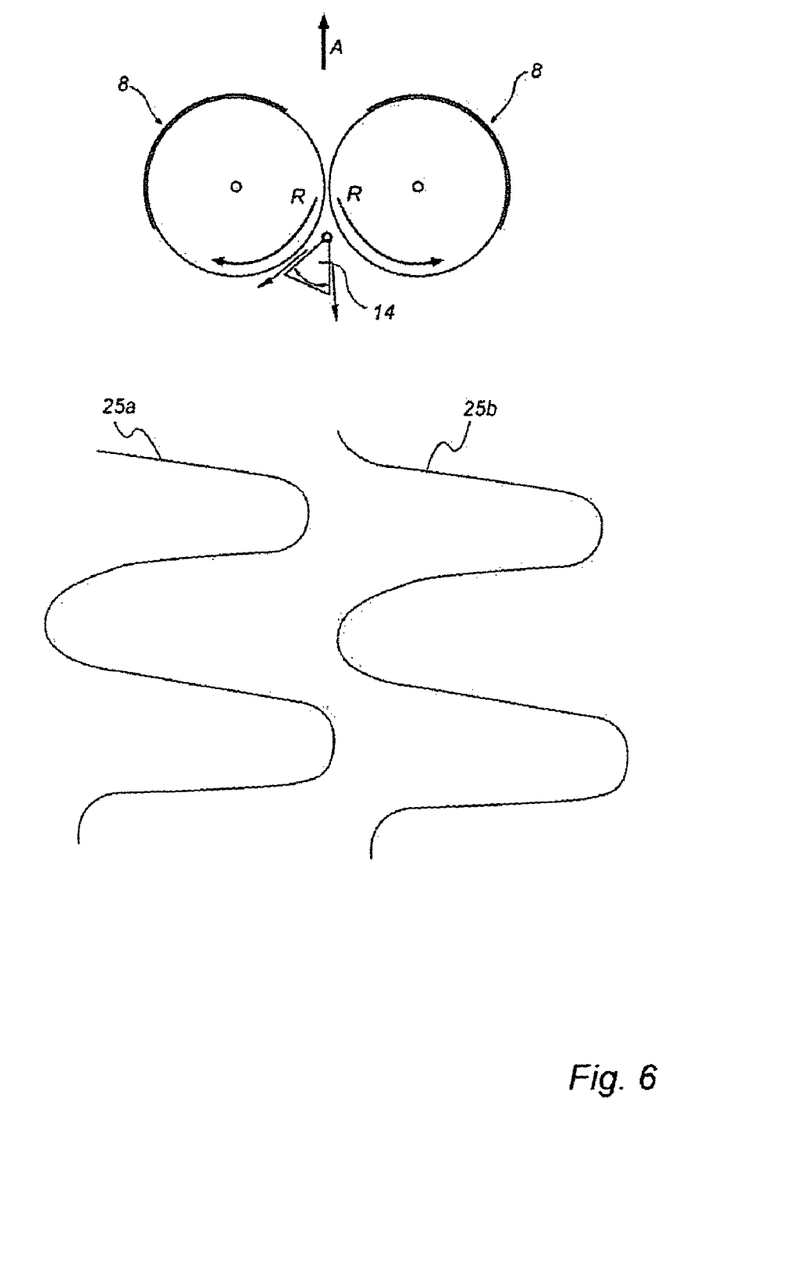
FIG. 6 shows schematically how crop residues are spread over a field.

In order further to improve the spreading of the chopped straw over the field 9, at least a part of the straw strikes the spreading member 14, which in normal operation is arranged to swing between its outer positions at suitable frequency. The spreading member 14 can also conceivably swing more towards its one outer position, if the weather conditions or other factors make this appropriate. In an extreme case, it can be set in a fixed position. FIG. 6 shows schematically how the chopped straw is spread over the field 9. The fact that the spreading of the straw is controlled by the spreading member 14 after the straw has left the spreader fans 8 in an oscillatory swinging motion over the field 9, as is represented by the schematized windrows 25a and 25b, one windrow from each spreader fan 8, allows a very accurate control of the spreading of the straw. Previously known spreading members 14 can be bulky and hence sluggish and energy-intensive to run, with the result that they were also slow in their oscillation. With the spreading member 14 according to the present invention, which is both simple and lightweight, the oscillation can be made faster and can hence spread the straw better. A large number of oscillatory motions of the spreading member 14 means that two corresponding positions of the schematic windrows 25a, 25b can come very close together.

Figure 7:
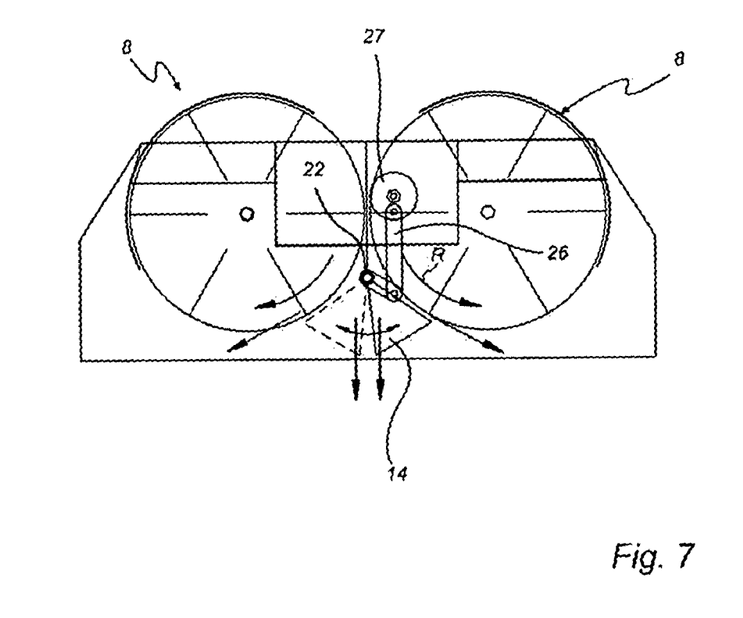
FIG. 7 shows in plan view parts of the rear part of the combine harvester in FIG. 1.

FIG. 7 shows schematically how the spreading member 14 is arranged to pivot about its shaft 22. A flywheel 27 is rotationally driven in a known but non-illustrated manner, for example via a belt drive. A cardan shaft system 26 is eccentrically disposed on the flywheel 27 such that a rotation of the flywheel 27 is converted by the cardan shaft system 26 into a swinging motion of the shaft 22. The rotation of the flywheel 27 can be adjusted such that the frequency is suitable for the intended use.

The spreading member 14 can be described as a device 14 for spreading crop residues over a field 9 and which, during use, is placed after a straw chopper 2 in a combine harvester 1, the device 14 having two vertical sides set at an angle to each other, which sides are pivotally disposed about a vertical shaft 22. It should be pointed out that the spreading member 14 is not dependent on the spreader fans 8 for its working and construction, but can also work without spreader fans 8 as these are described in the present invention. The same also applies to the various embodiments of the spreading member 14 which are described in the present application. However, there are additional advantages if these are provided together.

Figure 8:
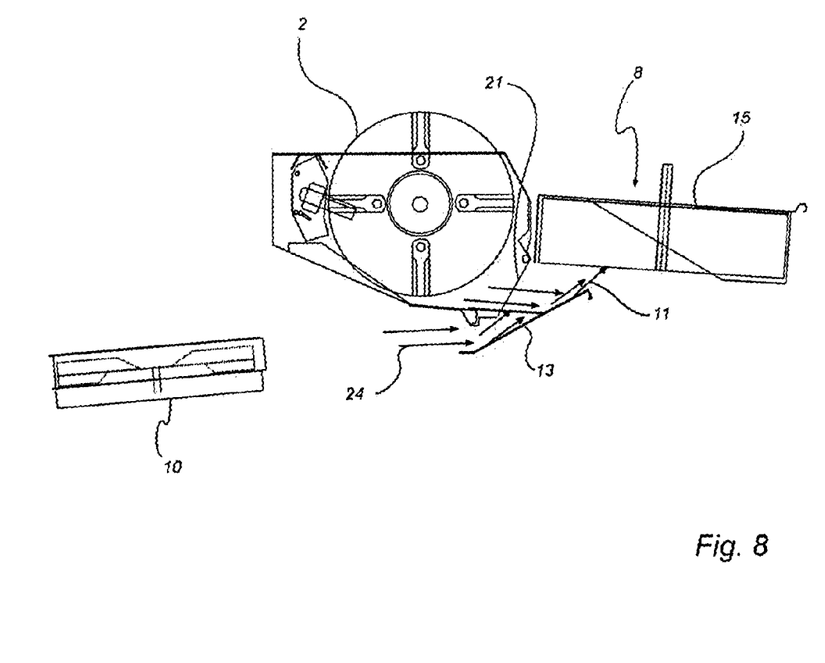
FIG. 8 shows a schematic side view of an alternative embodiment of the present invention.

FIG. 8 shows a schematic view of an alternative embodiment of the present invention. In this, the spreader fans 8 are not placed, calculated vertically, below the outlet 21 of the straw chopper 2, but above the same. The guide plate 13 is therefore instead placed below the outlet 21 and the stream of chopped straw is led at corresponding angles α and β into the spreader fans 8, the inlet openings 20 of which, in this embodiment, are therefore placed on the bottom side, whilst the discs 15 are placed on the top side.

Figure 9:
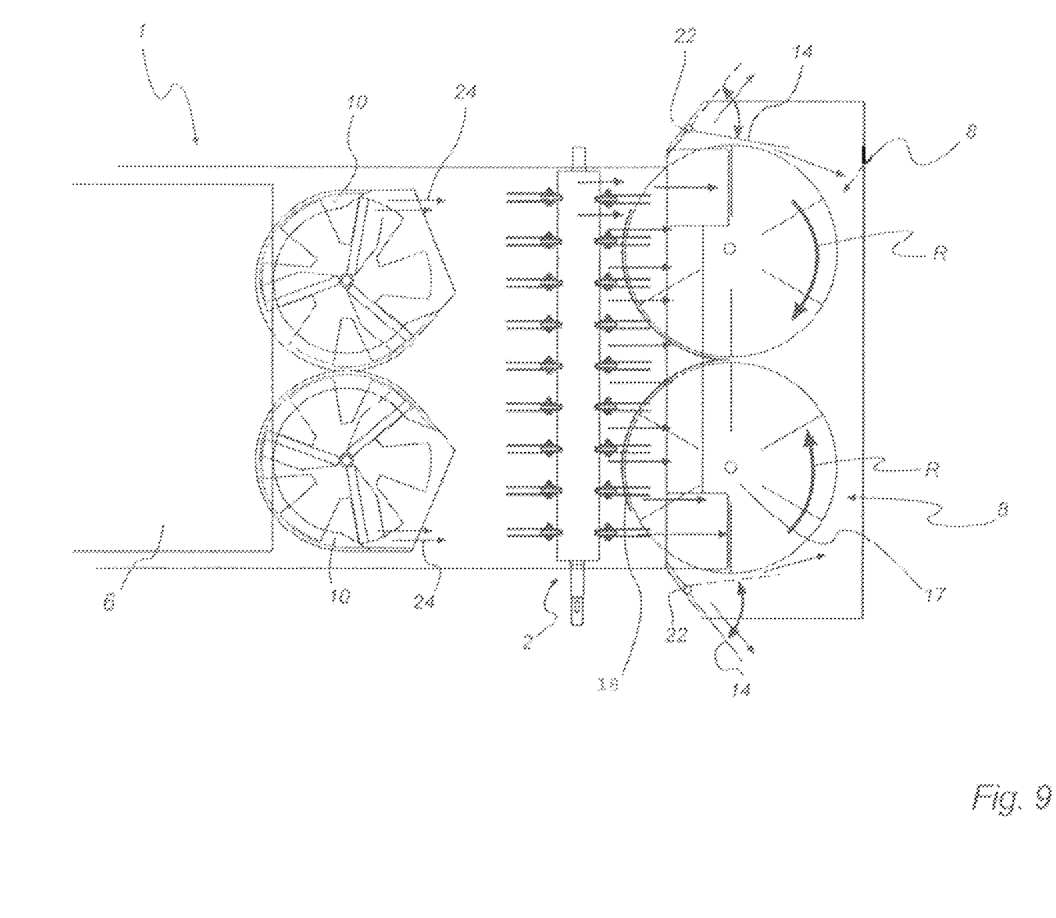
FIG. 9 shows in plan view a further alternative embodiment of the present invention.

FIG. 9 shows a further alternative embodiment. In this embodiment, the two spreader fans 8 rotate in the opposite direction R to that shown in previous figures. Instead of a wedge-shaped spreading member 14 symmetrically between the two spreader fans 8, two essentially straight vertical plates 14 are thus disposed in corresponding placement in the direction of travel A of the combine harvester 1, but one on each outer side of the spreader fans 8. In this embodiment, chaff is admitted on each outer side of the spreader fans 8. Thus, the baffle plate 18 and its connection along the periphery of the spreader fans 8 is instead such that it fully closes off the spreader fans 8 in the radial direction on their mutually facing sides. On the other hand, it allows chaff to be admitted in the radial direction into the spreader fans 8 on their sides facing away from each other, i.e. on the outer sides of the combine harvester.

The above-described embodiments are not limited to the concept of the invention, but describe only the currently preferred embodiments. Within the scope of the invention, many other variants can be envisaged and, for example, the angles of the guide plate 13 are not limited to those specified above, as long as the principle of its contribution to maintaining the velocity of the straw between the shafts 17 is maintained. Other differences are the type of combine harvester 1 and straw chopper 2, which, in itself, does not have any major bearing upon the present invention. For example, instead of a straw shaker 7 there can be rotors. Furthermore, the full width of the whole of the spreader fans 8 does not necessarily need to be utilized, but rather a greater part of the chopped straw can be fed into them towards the line of symmetry should this be deemed advantageous. The use of just one spreader fan 8 may also be envisaged. In addition, it is possible to control the spreader fans 8 and the spreading member 14 individually.

The invention claimed is:

1. A combine harvester, comprising:
a straw chopper including an inlet for unchopped straw and an outlet for chopped straw in an essentially horizontal direction, and a spreader fan, connected downstream of the outlet of the straw chopper and including an essentially horizontal plane of rotation, for spreading the chopped straw over a ground surface; and
a guide member, arranged to deflect at least a part of a stream of chopped straw material to an axial intake of the spreader fan such that the part of chopped straw material meets blades of the spreader fan in a direction of transport of the chopped straw material through the spreader fan, in a region in which the transport action of the spreader fan is equidirectional with the incoming stream of chopped straw material and at an acute angle relative to the plane of rotation of the spreader fan, the part of the stream of chopped straw material contributing to material movement through the spreader fan,
wherein another part of the stream of chopped straw material is deflected at a relatively more obtuse angle relative to the plane of rotation of the spreader fan than in the region in which the transport action of the spreader fan is equidirectional with the incoming stream of chopped straw material.

2. A combine harvester according to claim 1, wherein said acute angle relative to the plane of rotation of the spreader fan is 10-40°.

3. A combine harvester according to claim 1, wherein said relatively more obtuse angle relative to the plane of rotation of the spreader fan is 30-60°.

4. A combine harvester according to claim 1, wherein the spreader fan includes a front shield disposed along a part of the periphery of the spreader fan, as seen in a circumferential direction.

5. A combine harvester claim 1, wherein the spreader fan includes a front peripheral intake situated such that the transport action of the fan is equidirectional with the material flow feeding in through the front peripheral intake.

6. A combine harvester claim 1, wherein the spreader fan includes a collecting table fixedly attached to the fan blades on a side of the fan blades facing away from the axial intake.

7. A combine harvester according to claim 1, comprising a second spreader fan.

8. A combine harvester according to claim 1, further comprising a spreading member, pivotally disposed downstream of the spreader fan, said spreading member being pivotable between a first and a second outer position.

9. A combine harvester according to claim 8, wherein said spreading member is wedge-shaped and disposed essentially between two spreader fans.

10. A combine harvester according to claim 8, wherein said spreading member includes two essentially flat spreading surfaces, arranged to swing in tandem, each surface being disposed on the, in relation to the combine harvester, outer side of the respective spreader fan.

11. A combine harvester according to claim 10, wherein the spreading surfaces of said spreading member are arranged to be individually adjustable in relation to the respective spreader fan.

12. A combine harvester according to claim 1, wherein the rotation speed of the respective spreader fan is arranged to be individually controlled.

13. A method for spreading crop residues with a combine harvester, the combine harvester includes a straw chopper having an inlet for unchopped straw and an outlet for chopped straw in an essentially horizontal direction, and a spreader fan, connected downstream of the outlet of the straw chopper and including an essentially horizontal plane of rotation, for spreading the chopped straw over a ground surface, the method comprising:
deflecting at least a part of a stream of chopped straw material to an axial intake of the spreader fan such that the part of the chopped straw material meets blades of the spreader fan in a direction of transport of the chopped straw material through the spreader fan, in a region in which a transport action of the spreader fan is equidirectional with the incoming stream of chopped straw material, and at an acute angle relative to the plane of rotation of the spreader fan the part of the stream of chopped straw material contributing to material movement through the spreader fan, and
deflecting, by another part of the stream of chopped straw material, at a relatively more obtuse angle relative to the plane of rotation of the spreader fan than in the region in which the transport action of the spreader fan is equidirectional with the incoming stream of chopped straw material.

14. A combine harvester according to claim 1, wherein said acute angle relative to the plane of rotation of the spreader fan is 10-40°.

15. A combine harvester according to claim 2, wherein said acute angle relative to the plane of rotation of the spreader fan is 20-30°.

16. A combine harvester according to claim 15, wherein said acute angle relative to the plane of rotation of the spreader fan is 23-28°.

17. A combine harvester according to claim 14, wherein said relatively more obtuse angle relative to the plane of rotation of the spreader fan is 30-60°.

18. A combine harvester according to claim 3, wherein said relatively more obtuse angle relative to the plane of rotation of the spreader fan is 40-50°.

19. A combine harvester according to claim 18, wherein said relatively more obtuse angle relative to the plane of rotation of the spreader fan is 43-48°.

* * * * *